United States Patent
Yang et al.

(10) Patent No.: US 12,078,393 B2
(45) Date of Patent: Sep. 3, 2024

(54) AIR CONDITIONING SYSTEM

(71) Applicant: GUANGDONG MEIZHI PRECISION-MANUFACTURING CO., LTD., Guangdong (CN)

(72) Inventors: Yufei Yang, Guangdong (CN); Siqing Liao, Guangdong (CN); Yongdong Ou, Guangdong (CN)

(73) Assignee: GUANGDONG MEIZHI PRECISION-MANUFACTURING CO., LTD., Guangdong (CN)

( * ) Notice: Subject to any disclaimer, the term of this patent is extended or adjusted under 35 U.S.C. 154(b) by 452 days.

(21) Appl. No.: 17/372,620

(22) Filed: Jul. 12, 2021

(65) Prior Publication Data

US 2021/0341183 A1 Nov. 4, 2021

Related U.S. Application Data

(63) Continuation of application No. PCT/CN2019/109651, filed on Sep. 30, 2019.

(30) Foreign Application Priority Data

Apr. 28, 2019 (CN) .......................... 201910350874.2

(51) Int. Cl.
| | |
|---|---|
| F25B 41/42 | (2021.01) |
| F25B 13/00 | (2006.01) |
| F25B 31/02 | (2006.01) |
| F25B 41/20 | (2021.01) |

(Continued)

(52) U.S. Cl.
CPC .............. F25B 41/42 (2021.01); F25B 13/00 (2013.01); F25B 31/023 (2013.01); F25B 41/20 (2021.01);

(Continued)

(58) Field of Classification Search
CPC ........ F25B 41/42; F25B 31/023; F25B 41/20; F25B 2400/074; F25B 49/02
See application file for complete search history.

(56) References Cited

FOREIGN PATENT DOCUMENTS

| CN | 1187583 A | 7/1998 |
|---|---|---|
| CN | 101592388 A | 12/2009 |

(Continued)

OTHER PUBLICATIONS

International Search Report dated Jan. 15, 2020 received in International Applicatin No. PCT/CN2019/109651 together with an English language translation.

(Continued)

*Primary Examiner* — Ana M Vazquez
(74) *Attorney, Agent, or Firm* — Scully, Scott, Murphy & Presser, P.C.

(57) ABSTRACT

An air conditioning system is provided. The system has a high-pressure pipe, a low-pressure pipe, an indoor heat exchanger, an outdoor heat exchanger, a leak-free thermal expansion valve and a variable capacity compressor. The variable capacity compressor has a shell, a first cylinder and a second cylinder. The shell has a suction port and an exhaust port. The first cylinder has a first suction hole connected to the suction port and a first exhaust hole connected to the exhaust port. The second cylinder has a second suction hole connected to the suction port, a second exhaust hole connected to the exhaust port, and a pressure relief hole connected to the high-pressure pipe and the low-pressure pipe in an on-off manner. Before the variable capacity compressor is started, the high-pressure pipe and the low-pressure pipe are connected and also disconnected after the first preset duration.

12 Claims, 2 Drawing Sheets

(51) Int. Cl.
*F25B 41/33* (2021.01)
*F25B 41/36* (2021.01)
*F25B 41/39* (2021.01)

(52) U.S. Cl.
CPC .............. *F25B 41/33* (2021.01); *F25B 41/36* (2021.01); *F25B 41/39* (2021.01); *F25B 2341/0683* (2013.01); *F25B 2400/074* (2013.01)

(56) References Cited

FOREIGN PATENT DOCUMENTS

| | | | | |
|---|---|---|---|---|
| CN | 104912795 | A | | 9/2015 |
| CN | 105782038 | A | * | 7/2016 |
| CN | 106766422 | A | | 5/2017 |
| CN | 206281240 | U | | 6/2017 |
| CN | 107356006 | A | * | 11/2017 ................ F25B 1/04 |
| CN | 107726661 | A | * | 2/2018 .............. F25B 13/00 |
| CN | 207230987 | U | | 4/2018 |
| CN | 207815765 | U | | 9/2018 |
| CN | 208349616 | U | | 1/2019 |
| KR | 101266107 | B1 | | 5/2013 |
| WO | 2015194020 | A1 | | 12/2015 |

OTHER PUBLICATIONS

First Office Action dated Mar. 1, 2021 received in Chinese Patent Application No. 201910350874.2 together with an English language translation.

\* cited by examiner

AIR CONDITIONING SYSTEM

CROSS-REFERENCES TO RELATED APPLICATIONS

The present application is a continuation application of PCT International Application No. PCT/CN2019/109651, filed on Sep. 30, 2019, which claims the priority of Chinese Patent Application No. 201910350874.2, filed in the CNIPA on Apr. 28, 2019 and entitled "AIR CONDITIONING SYSTEM", the entire contents of which are herein incorporated by reference for all purposes. No new matter has been introduced.

FIELD

The present disclosure relates to the field of refrigeration technology, and particularly, to an air conditioning system.

BACKGROUND

At present, in related technologies, the compressor used in the fixed-speed air conditioning system operates at a fixed speed, when the indoor thermal load is less than the cooling capacity of the compressor, the compressor must continue to start and stop, and only in this way can the room temperature be maintained approximately constant. The frequent start and stop of the compressor reduces the refrigeration efficiency of the refrigeration system at part load, and the energy efficiency of the year drops.

In order to improve the annual energy efficiency of the air conditioning system, one method is to use a variable capacity compressor. The variable capacity refrigeration compressor is a compressor with two or more compression chambers, typically a rotary compressor with two cylinders. When the cooling load is large, the compressor operates at full-capacity (two cylinders work at the same time); when the cooling load is small, the compressor only operates at partial-capacity (only one cylinder works, another one does not work). The air conditioning system using variable capacity compressors can avoid the frequent start and stop of the compressor at part load and the reduced part load efficiency of the fixed-speed air conditioning system. Its SEER (seasonal energy efficiency ratio) is much higher than the fixed-speed air conditioning system. Although it is still lower than the variable-frequency air conditioning system, its cost is much lower than that of the variable-frequency air conditioning system. It can be said that the variable capacity compressor is a compromise solution that takes into account the low cost of the fixed-speed compressor and the high efficiency of the variable-frequency compressor. It is an important direction in the development of compressor technology in recent years. Its design focuses on how to set up a reasonable variable volume program.

In order to improve the annual energy efficiency of the air conditioning system, another method is to use the residual cold and residual heat in the indoor heat exchanger when the compressor is stopped. After the air conditioning system continues to operate for a period of time, the compressor just stopped and the refrigerant in the indoor and outdoor heat exchanger has not reached a complete pressure balance, the refrigerant in the indoor heat exchanger is still at a low temperature (in cooling mode) or high temperature (in heating mode). At this time, if the indoor side fan continues to operate for a period of time, it can continue to supply cold or hot air to the room for a period of time with lower energy consumption, which is the use of residual cold or residual heat. However, this is only an ideal situation, since most conventional air conditioning systems use capillary tubes, electronic expansion valves, thermal expansion valves, etc. as throttling parts, these throttling parts do not have the ability to completely shut off when the compressor is stopped. Therefore, when the compressor just stops operating, the refrigerant on the high-pressure side will quickly flow to the low-pressure side through the throttling part, so that the high-temperature refrigerant on the high-pressure side and the low-temperature refrigerant on the low-pressure side are quickly mixed, and the high and low pressures of the system quickly reach a state of pressure balance, and the refrigerant temperature in the indoor and outdoor heat exchangers also quickly reach a temperature equilibrium state. Therefore, the utilization value of the residual cold or residual heat in the indoor side heat exchanger is not high, and the design focuses on how to safely and effectively use the residual cold or residual heat.

Therefore, in order to achieve the above-mentioned two methods, it is necessary to overcome their respective difficulties, but to configure a certain supporting structure for the two separately will increase the structural complexity of the air conditioning system and increase the cost.

SUMMARY

The present disclosure aims to solve at least one of the technical problems existing in the prior art or related technologies.

For this reason, one aspect of the present disclosure provides an air conditioning system.

In view of this, according to one aspect of the present disclosure, an air conditioning system is provided, comprising: a high-pressure pipe, a low-pressure pipe, an indoor heat exchanger, an outdoor heat exchanger, a leak-free thermal expansion valve and a variable capacity compressor, the high-pressure pipe is used for circulation of high-pressure refrigerant; the low-pressure pipe is used for circulation of low-pressure refrigerant, and the low-pressure pipe is capable of connecting to the high-pressure pipe in an on-off manner; the indoor heat exchanger is connected with one of the high-pressure pipe and the low-pressure pipe; the outdoor heat exchanger is connected with another one of the high-pressure pipe and the low-pressure pipe; the leak-free thermal expansion valve is connected between the indoor heat exchanger and the outdoor heat exchanger; the variable capacity compressor comprises a shell, a first cylinder and a second cylinder, the shell is provided with a suction port and an exhaust port; the first cylinder is provided with a first suction hole connected with the suction port, a first exhaust hole connected with the exhaust port, and a pressure relief hole simultaneously connected to the high-pressure pipe and the low-pressure pipe in an on-off manner; and the second cylinder is provided with a second suction hole connected with the suction port, and the second exhaust hole is connected with the exhaust port, wherein before the variable capacity compressor is started, the high-pressure pipe and the low-pressure pipe are connected, and disconnected after the first preset duration.

The air conditioning system provided in the embodiment of the present disclosure, on the one hand, by arranging a leak-free thermal expansion valve between the indoor heat exchanger and the outdoor heat exchanger, the refrigerant on the high pressure side and the low pressure side of the air conditioning system can be blocked after the variable capacity compressor is stopped, and do not let the refrigerant mix to achieve pressure or temperature balance (the compressor cylinder itself has a good sealing effect when it is stopped. Therefore, the refrigerant cannot be quickly balanced by the compressor cylinder), so that the residual cold or residual heat in the indoor heat exchanger can be used to improve the annual energy efficiency of the air conditioning system.

For example, the leak-free thermal expansion valve is a kind of thermal expansion valve, which plays a normal throttling role when the high and low pressure difference is large, and it shuts off when the pressure difference between both sides is reduced to a certain extent. Therefore, when the variable capacity compressor is stopped, it can effectively keep the high-pressure refrigerant with higher temperature and the low-pressure refrigerant with lower temperature in the condenser and evaporator respectively.

Furthermore, the leak-free thermal expansion valve completely cuts off the pipeline between the indoor heat exchanger and the outdoor heat exchanger when the variable capacity compressor is stopped, and the high and low pressures cannot be completely balanced. Therefore, when the variable capacity compressor is restarted, it will bring a greater start-up shock to the variable capacity compressor (especially the rotor compressor with small aerodynamic torque and sensitive to the starting pressure difference). By connecting the low-pressure pipe and the high-pressure pipe of the air conditioning system in an on-off manner, and turning on the low-pressure pipe and the high-pressure pipe for the first preset duration before the variable capacity compressor is started, the refrigerant on the high pressure side and the low pressure side can be mixed to achieve rapid pressure balance, which ensures the smooth and safe start of the variable capacity compressor. Wherein the first preset duration is related to the mixing speed of the refrigerant, is affected by the pressure difference between the high pressure side and the low pressure side, and is also affected by the refrigerant charge, viscosity and flow resistance. For specific air conditioning systems, a reasonable value of the first preset duration can be obtained through theoretical analysis combined with experiments.

On the other hand, by configuring a variable capacity compressor with a first cylinder and a second cylinder, the operating capacity can be adjusted according to the indoor cooling or heating load. It avoids the frequent start and stop of the compressor at part load and the reduced part load efficiency of the fixed-speed air conditioning system. Its SEER is much higher than the fixed-speed air conditioning system. Although it is still lower than the variable-frequency air conditioning system, its cost is much lower than that of the variable-frequency air conditioning system, and it takes both low cost and high efficiency into consideration.

For example, both the first exhaust hole and the second exhaust hole communicate with the inside of the shell, and then communicate with the exhaust port. The first cylinder adopts an unloading method of sliding vane groove pressure change, and determines whether the cylinder is working by controlling the pressure of the sliding vane cavity. For the air conditioning system, the pressure of the high-pressure refrigerant in the high-pressure pipe is consistent with the pressure of the exhaust port of the variable capacity compressor, and the pressure of the low-pressure refrigerant in the low-pressure pipe is consistent with the pressure of the suction port of the variable capacity compressor, and the pressure relief hole of the first cylinder is simultaneously connected to the high-pressure pipe and the low-pressure pipe in an on-off manner. When the pressure relief hole is connected with the high-pressure pipe, the first cylinder can work normally, that is, it can compress the gas normally; when the pressure relief hole is connected with the low-pressure pipe, the first cylinder is unloaded due to the same intake and exhaust pressure. At this time, the first cylinder does not work, that is, it cannot participate in gas compression. The second cylinder is an ordinary cylinder and can always compress gas when the variable capacity compressor is operating.

In summary, the present disclosure can isolate the high-temperature refrigerant and the low-temperature refrigerant when the variable capacity compressor is stopped, by configuring the leak-free thermal expansion valve, so as to utilize the residual cold or residual heat in the indoor heat exchanger and improve the annual energy efficiency of the air conditioning system. The present disclosure also connects the low-pressure pipe and the high-pressure pipe, and the pressure relief hole of the first cylinder of the variable capacity compressor of the air conditioning system in an on-off manner. There are three on-off states between the three and can be switched at different timings. The first is to connect the low-pressure pipe with the high-pressure pipe before starting the variable capacity compressor, to achieve rapid pressure balance on the high pressure side and the low pressure side and ensure the safety of the variable capacity compressor to start. The second is to connect the low-pressure pipe with the pressure relief hole to unload the first cylinder when starting the variable capacity compressor, so that the variable capacity compressor only operates at partial capacity. The third is to connect the high-pressure pipe with the pressure relief hole, to make the first cylinder work normally, when starting the variable capacity compressor. The latter two on-off states respectively correspond to the two operating capacities of the variable capacity compressor. Switching between the two can realize the switching of the operating capacity of the variable capacity compressor, which helps to improve seasonal energy efficiency. It is understandable that when the variable capacity compressor is stopped, the leak-free thermal expansion valve plays a partition role, the on-off state between the above-mentioned three does not need to change, that is, there is no need to switch the operating capacity of the variable capacity compressor.

The present disclosure can effectively utilize the residual cold or residual heat by configuring the leak-free thermal expansion valve, and use the different working states of a set of on-off structures at different timings, and at the same time, realize the safe start and the switching of the operating capacity of the variable capacity compressor. While improving the annual energy efficiency of the air conditioning system, it is not only convenient for practical application, and low cost.

In addition, the air conditioning system in the above-mentioned embodiment provided by the present disclosure may also have the following additional technical features.

In some possible designs, the air conditioning system further comprises a three-way valve, wherein a first end port of the three-way valve is connected to the pressure relief hole, a second end port of the three-way valve is connected to the high-pressure pipe, and a third end port of the three-way valve is connected to the low-pressure pipe.

In this design, an on-off scheme between the high-pressure pipe, the low-pressure pipe and the pressure relief hole is defined. By configuring the three-way valve, its three end ports are respectively connected to the pressure relief hole, the high-pressure pipe and the low-pressure pipe, which can achieve different conduction states between the three, and then switch the different operating states of the air conditioning system. For example, the three-way valve has three conduction states. In the first conduction state, the first end port and the second end port are turned on, and the third end port is disconnected. At this time, the pressure relief hole is connected with the high-pressure pipe, the first cylinder can work normally, and the variable capacity compressor operates at full-capacity. In the second conduction state, the first end port and the third end port are turned on, and the second end port is disconnected. At this time, the pressure relief hole is connected with the low-pressure pipe, the first cylinder is unloaded, and the variable capacity compressor only operates at partial-capacity. In the third conduction state, the second end port and the third end port are turned on, and the first end port is disconnected, which can achieve rapid pressure balance before the variable capacity compressor starts, ensuring the safety of the variable capacity compressor restarting. This solution uses only one three-way valve to achieve the following three functions: the variable capacity compressor can switch between full-capacity operation mode and partial-capacity operation mode, maintain a high and low pressure difference when the variable capacity compressor is stopped to make full use of the residual cold or residual heat in the indoor heat exchanger of the air conditioning system, and achieve high and low pressure balance before the variable capacity compressor starts to avoid the variable capacity compressor from starting with load. While achieving the improvement of the annual energy efficiency of the air conditioning system, the goal of reducing the system cost has been achieved. Wherein the three-way valve can be a variety of valves, for example, an electromagnetic three-way valve can be used to facilitate automatic control.

In some possible designs, the air conditioning system further comprises a first solenoid valve and a second solenoid valve, the first solenoid valve is connected between the pressure relief hole and the high-pressure pipe; and the second solenoid valve is connected between the pressure relief hole and the low-pressure pipe.

In this design, another on-off solution between the high-pressure pipe, the low-pressure pipe and the pressure relief hole is defined. By configuring the first solenoid valve between the pressure relief hole and the high-pressure pipe, and configuring the second solenoid valve between the pressure relief hole and the low-pressure pipe, therefore, the first cylinder can work normally when only the first solenoid valve is turned on (equivalent to the first conduction state of the three-way valve), and the first cylinder can be unloaded when only the second solenoid valve is turned on (equivalent to the second conduction state of the three-way valve), when the first solenoid valve and the second solenoid valve are turned on at the same time, the high-pressure pipe and the low-pressure pipe are connected through the pressure relief hole, which can achieve rapid pressure balance before the variable capacity compressor is started (equivalent to the third conduction state of the three-way valve). By controlling the action timing of the first solenoid valve and the second solenoid valve, the following three functions are realized: the variable capacity compressor can switch between full-capacity operation mode and partial-capacity operation mode, maintain a high and low pressure difference when the variable capacity compressor is stopped to make full use of the residual cold or residual heat in the indoor heat exchanger of the air conditioning system, and achieve high and low pressure balance before the variable capacity compressor starts to avoid the variable capacity compressor from starting with load. The structure is simple, easy to control, and low cost.

In some possible designs, the air conditioning system further comprises a four-way valve, wherein a first interface of the four-way valve is connected to the exhaust port, a second interface of the four-way valve is connected to the outdoor heat exchanger, and a third interface of the four-way valve is connected to the suction port, and a fourth interface of the four-way valve is connected to the indoor heat exchanger.

In this design, the air conditioning system is also provided with a four-way valve, and the four-way valve has four interfaces, which are connected to the exhaust port of the variable capacity compressor and the outdoor heat exchanger, and the suction port of the variable capacity compressor and the indoor heat exchanger. The four-way valve has two conduction states to switch between the cooling mode and the heating mode. In the first conduction state, the first interface and the second interface are connected, that is, the exhaust port is connected with the outdoor heat exchanger, and the outdoor heat exchanger is used as the condenser. The third interface and the fourth interface are connected, that is, the suction port is connected with the indoor heat exchanger, the indoor heat exchanger is used as the evaporator, and the air conditioning system operates in the cooling mode. In the second conduction state, the first interface and the fourth interface are connected, that is, the exhaust port is connected with the indoor heat exchanger, the indoor heat exchanger is used as the condenser, the second interface and the third interface are connected, that is, the suction port is connected with the outdoor heat exchanger, and the outdoor heat exchanger is used as the evaporator, the air conditioning system operates in the heating mode.

In some possible designs, both ends of the high-pressure pipe are respectively connected to the first interface and the exhaust port, and both ends of the low-pressure pipe are respectively connected to the third interface and the suction port.

In this design, a setting solution for the high-pressure pipe and the low-pressure pipe is defined. The two are directly connected to the exhaust port and suction port, adjacent to the pressure relief hole, which can shorten the layout of the pipeline.

In some possible designs, both ends of one of the high-pressure pipe and the low-pressure pipe are respectively connected to the indoor heat exchanger and the leak-free thermal expansion valve, and both ends of another one of the high-pressure pipe and the low-pressure pipe are respectively connected to the outdoor heat exchanger and the leak-free thermal expansion valve.

In this design, another setting solution of the high-pressure pipe and the low-pressure pipe is defined. Since the leak-free thermal expansion valve is connected between the indoor heat exchanger and the outdoor heat exchanger, when the air conditioning system is operating normally, the pipes connected to its both ends are the high-pressure pipe and the low-pressure pipe, respectively. It is also possible to switch the capacity of the variable capacity compressor and quickly balance the pressure before the variable capacity compressor is started. The difference between this solution and the previous solution is that the pipelines at both ends of the leak-free thermal expansion valve are not constant high-pressure pipes or low-pressure pipes. When the air conditioning system operates in the cooling mode, the outdoor heat exchanger is on the high-pressure side and the indoor heat exchanger is on the low-pressure side. The pipeline between the outdoor heat exchanger and the leak-free thermal expansion valve is a high-pressure pipe, the pipeline between the indoor heat exchanger and the leak-free thermal expansion valve is a low-pressure pipe, otherwise, they are interchanged, and it won't be repeated here.

In some possible designs, the leak-free thermal expansion valve is a one-way throttling part, which only plays a throttling role when the refrigerant flows from the outdoor heat exchanger to the indoor heat exchanger, and only plays a circulation role when the refrigerant flows in a reverse direction; the air conditioning system further comprises a one-way throttling device, wherein the one-way throttling device is connected to the leak-free thermal expansion valve, and only plays a throttling role when the refrigerant flows from the indoor heat exchanger to the outdoor heat exchanger, and only plays a circulation role when the refrigerant flows in a reverse direction.

In this design, the leak-free thermal expansion valve is specifically limited as a one-way throttling part, which only plays a throttling role when the refrigerant flows in the forward direction, and only plays a circulation role when the refrigerant flows in the reverse direction. In order to realize the normal operation of the air conditioning system in different modes, a one-way throttling device with the throttling direction opposite to the leak-free thermal expansion valve is also set. The one-way throttling device also belongs to the one-way throttling part. With the cooperation of the two, it can ensure the smooth throttling of the refrigerant in both cooling mode and heating mode.

In some possible designs, the leak-free thermal expansion valve comprises: a valve body, and a first valve port, a second valve port, an external balance tube, and a temperature sensing bag, and connected to the valve body; the first valve port is directly or indirectly connected to the outdoor heat exchanger; the second valve port is directly or indirectly connected to the indoor heat exchanger; the external balance tube is connected with the suction port; and the temperature sensing bag is arranged on a pipeline between the external balance tube and the suction port, and adjacent to a pipeline junction point of the external balance tube and the suction port, wherein, in a case where a pressure difference between the first valve port and the second valve port is greater than or equal to a conduction pressure difference, and the refrigerant flows from the first valve port to the second valve port, the leak-free thermal expansion valve plays a throttling role; in a case where a pressure difference between the first valve port and the second valve port is greater than or equal to a conduction pressure difference, and the refrigerant flows from the second valve port to the first valve port, the leak-free thermal expansion valve plays a circulation role; in a case where a pressure difference between the first valve port and the second valve port is less than a conduction pressure difference, the leak-free thermal expansion valve is turned off.

In this design, the structure of the leak-free thermal expansion valve and the corresponding operating characteristics are defined. The leak-free thermal expansion valve is a one-way throttling part with pressure-maintaining function, which can be turned on when the variable capacity compressor is operating to ensure the smooth throttling of the refrigerant, and it will be turned off when the pressure difference between the high pressure side and the low pressure side is reduced, to avoid refrigerant mixing on the high pressure side and the low pressure side, the residual cold or residual heat in the indoor heat exchanger can be used to improve the annual energy efficiency of the air conditioning system.

In some possible designs, a value range of the first preset duration is 3 to 60 seconds.

In this design, the value range of the first preset duration is specifically defined from 3 to 60 seconds. The lower limit can ensure the effective balance of the pressure difference between the high pressure side and the low pressure side, and ensure the smooth and safe start of the variable capacity compressor. The upper limit helps to control the time-consuming adjustment of the pressure, and avoids the air conditioning system from being turned on for a long time and affecting the user's experience.

In some possible designs, the air conditioning system further comprises an indoor fan and a controller, the indoor fan is arranged toward the indoor heat exchanger; and the controller is electrically connected to the indoor fan, and controlling the indoor fan to continue to operate for a second preset duration after the variable capacity compressor is stopped.

In this design, the air conditioning system also comprises an indoor fan set towards the indoor heat exchanger and a controller electrically connected to the indoor fan. The indoor fan is controlled by the controller to continue to operate for a second preset duration after the shutdown, and the air can continue to be supplied to the room. This makes full use of the residual cold or residual heat of the refrigerant remaining in the indoor heat exchanger after the shutdown, which is beneficial to increase the energy efficiency of the air conditioning system.

In some possible designs, a value range of the second preset duration is 60 to 90 seconds.

In this design, the value range of the second preset duration is specifically defined from 60 to 90 seconds. This lower limit can ensure full use of the residual cold or residual heat of the refrigerant in the indoor heat exchanger, and increase the energy efficiency of the air conditioning system. The upper limit can avoid blowing hot or cold air into the room after the residual cold or residual heat is exhausted, which helps to improve the health and comfort of users.

Additional aspects and advantages of the present disclosure will become apparent in the following description or will be learned by practice of the present disclosure.

BRIEF DESCRIPTION OF THE DRAWINGS

The above and/or additional aspects and advantages of the present disclosure will become apparent and readily understood from the description of embodiments in conjunction with the following drawings.

Figure 1:
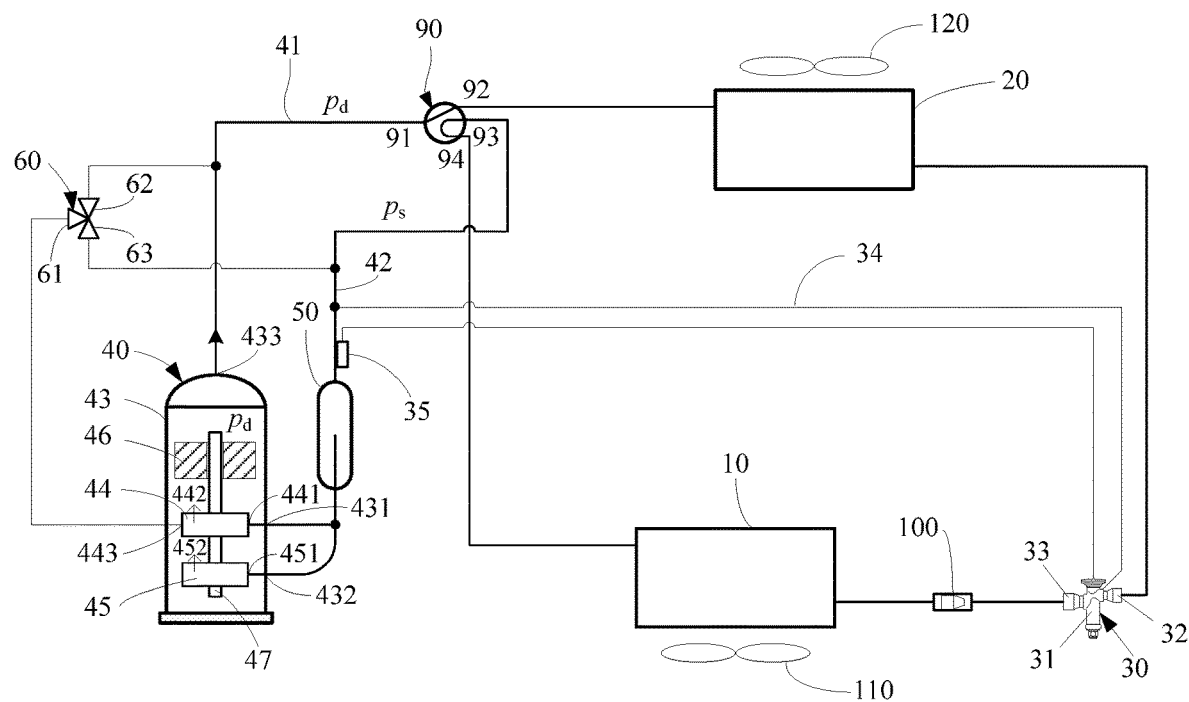
FIG. 1 shows a structural schematic diagram of an air conditioning system in a cooling mode according to an embodiment of the present disclosure.

The corresponding relationship between the reference signs and component names in FIG. 1 to FIG. 4 is as follows:

10 indoor heat exchanger, 20 outdoor heat exchanger, 30 leak-free thermal expansion valve, 31 valve body, 32 first valve port, 33 second valve port, 34 external balance tube, 35 temperature sensing bag, 40 variable capacity compressor, 41 exhaust pipe, 42 suction pipe, 43 shell, 431 first suction port, 432 second suction port, 433 exhaust port, 44 first cylinder, 441 first suction hole, 442 first exhaust hole, 443 pressure relief hole, 45 second cylinder, 451 second suction hole, 452 second exhaust hole, 46 motor, 47 crankshaft, 50 gas-liquid separator, 60 three-way valve, 61 first end port, 62 second end port, 63 third end port, 70 first solenoid valve, 80 second solenoid valve, 90 four-way valve, 91 first interface, 92 second interface, 93 third interface, 94 fourth interface, 100 one-way throttling short pipe, 110 indoor fan, 120 outdoor fan.

DETAILED DESCRIPTION OF THE DISCLOSURE

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

The air conditioning system according to some embodiments of the present disclosure will be described below with reference to FIG. 1 to FIG. 4.

As shown in FIGS. 1 to 4, an embodiment of one aspect of the present disclosure provides an air conditioning system, comprising: a high-pressure pipe, a low-pressure pipe, an indoor heat exchanger 10, an outdoor heat exchanger 20, a leak-free thermal expansion valve 30 and a variable capacity compressor 40, the high-pressure pipe (for example, the exhaust pipe 41 of the variable capacity compressor 40 is connected to the exhaust port 433) is used for circulation of high-pressure refrigerant; the low-pressure pipe (for example, the suction pipe 42 of the variable capacity compressor 40 is connected to the suction port) is used for circulation of low-pressure refrigerant, and the low-pressure pipe is capable of connecting to the high-pressure pipe in an on-off manner; the indoor heat exchanger 10 is connected with one of the high-pressure pipe and the low-pressure pipe; the outdoor heat exchanger 20 is connected with another one of the high-pressure pipe and the low-pressure pipe; the leak-free thermal expansion valve 30 is connected between the indoor heat exchanger 10 and the outdoor heat exchanger 20; the variable capacity compressor 40 comprises a shell 43, a first cylinder 44 and a second cylinder 45, the shell 43 is provided with a suction port (comprising a first suction port 431 and a second suction port 432) and an exhaust port 433; the first cylinder 44 is provided with a first suction hole 441 connected with the first suction port 431, a first exhaust hole 442 connected with the exhaust port 433, and a pressure relief hole 443 simultaneously connected to the high-pressure pipe and the low-pressure pipe in an on-off manner; and the second cylinder is provided with a second suction hole 451 connected with the second suction port 432, and the second exhaust hole 452 is connected with the exhaust port 433. Before the variable capacity compressor 40 is started, the high-pressure pipe and the low-pressure pipe are connected, and disconnected after a first preset duration.

The air conditioning system provided in the embodiment of the present disclosure, on the one hand, by arranging a leak-free thermal expansion valve 30 between the indoor heat exchanger 10 and the outdoor heat exchanger 20, the refrigerant on the high pressure side and the low pressure side of the air conditioning system can be blocked after the variable capacity compressor 40 is stopped, and do not let the refrigerant mix to achieve pressure or temperature balance (the compressor cylinder itself has a good sealing effect when it is stopped; thus, the refrigerant cannot be quickly balanced by the compressor cylinder), so that the residual cold or residual heat in the indoor heat exchanger 10 can be used to improve the annual energy efficiency of the air conditioning system.

For example, the leak-free thermal expansion valve 30 is a kind of thermal expansion valve, which plays a normal throttling role when the high and low pressure difference is large, and it shuts off when the pressure difference between both sides is reduced to a certain extent. Therefore, when the variable capacity compressor 40 is stopped, it can effectively keep the high-pressure refrigerant with higher temperature and the low-pressure refrigerant with lower temperature in the condenser and evaporator respectively.

Furthermore, the leak-free thermal expansion valve 30 completely cuts off the pipeline between the indoor heat exchanger 10 and the outdoor heat exchanger 20 when the variable capacity compressor 40 is stopped, and the high and low pressures cannot be completely balanced. Therefore, when the variable capacity compressor 40 is restarted, it will bring a greater start-up shock to the variable capacity compressor 40 (especially the rotor compressor with small aerodynamic torque and sensitive to the starting pressure difference). By connecting the low-pressure pipe and the high-pressure pipe of the air conditioning system in an on-off manner, and turning on the low-pressure pipe and the high-pressure pipe for the first preset duration before the variable capacity compressor 40 is started, the refrigerant on the high pressure side and the low pressure side can be mixed to achieve rapid pressure balance, which ensures the smooth and safe start of the variable capacity compressor 40. The first preset duration is related to the mixing speed of the refrigerant, is affected by the pressure difference between the high pressure side and the low pressure side, and is also affected by the refrigerant charge, viscosity and flow resistance. For different air conditioning systems, a reasonable value of the first preset duration can be obtained through theoretical analysis combined with experiments.

On the other hand, by configuring a variable capacity compressor 40 with a first cylinder 44 and a second cylinder 45, the operating capacity can be adjusted according to the indoor cooling or heating load. This operation avoids the frequent start and stop of the compressor at part load and the reduced part load efficiency of the fixed-speed air conditioning system. The SEER of the exemplary air conditioning system is much higher than the fixed-speed air conditioning system. Although the SEER of the exemplary air conditioning system is still lower than the variable-frequency air conditioning system, the cost of the exemplary air conditioning system is much lower than that of the variable-frequency air conditioning system. Thus, the exemplary air conditioning system is advantageous, taking into consideration both low cost and high efficiency.

For example, the first exhaust hole 442 and the second exhaust hole 452 are connected with the inside of the shell 43, and then connected with the exhaust port 433. The variable capacity compressor 40 is a two-cylinder variable capacity rotary compressor, and also comprises a motor 46 and a crankshaft 47. The first cylinder 44, the second cylinder 45 and the motor 46 are installed on the same crankshaft 47, and the crankshaft 47 rotates with the rotation of the motor 46, driving the first cylinder 44 and the second cylinder 45 to operate. The suction pipe 42 of the variable capacity compressor 40 is also provided with a gas-liquid separator 50. The first cylinder 44 adopts an unloading method of sliding vane groove pressure change, and determines whether the cylinder is working by controlling the pressure of the sliding vane cavity. For the air conditioning system, the pressure of the high-pressure refrigerant in the high-pressure pipe is consistent with the pressure of the exhaust port 433 of the variable capacity compressor 40, which is both Pd, and the pressure of the low-pressure refrigerant in the low-pressure pipe is consistent with the pressure of the suction port of the variable capacity compressor 40, which is both Ps, and the pressure relief hole 443 of the first cylinder 44 is simultaneously connected to the high-pressure pipe and the low-pressure pipe in an on-off manner. When the pressure relief hole 443 is connected with the high-pressure pipe, the first cylinder 44 can work normally, that is, it can compress the gas normally; when the pressure relief hole 443 is connected with the low-pressure pipe, the first cylinder 44 is unloaded due to the same intake and exhaust pressure. At this time, the first cylinder 44 does not work, that is, it cannot participate in gas compression. The second cylinder 45 is an ordinary rotary compressor's cylinder and when the motor 46 is energized, the second cylinder 45 always works, that is, it can always compress the gas.

In summary, the present disclosure can isolate the high-temperature refrigerant and the low-temperature refrigerant when the variable capacity compressor 40 is stopped, by configuring the leak-free thermal expansion valve 30, so as to utilize the residual cold or residual heat in the indoor heat exchanger 10 and improve the annual energy efficiency of the air conditioning system. The present disclosure also connects the low-pressure pipe and the high-pressure pipe, and the pressure relief hole 443 of the first cylinder 44 of the variable capacity compressor 40 of the air conditioning system in an on-off manner. There are three on-off states between the three and can be switched at different timings. The first is to connect the low-pressure pipe with the high-pressure pipe before starting the variable capacity compressor 40, to achieve rapid pressure balance on the high pressure side and the low pressure side and ensure the safety of the variable capacity compressor 40 to start. The second is to connect the low-pressure pipe with the pressure relief hole 443 to unload the first cylinder 44 when starting the variable capacity compressor 40, so that the variable capacity compressor 40 only operates at partial-capacity. The third is to connect the high-pressure pipe with the pressure relief hole 443, to make the first cylinder 44 work normally, when starting the variable capacity compressor 40. The latter two on-off states respectively correspond to the two operating capacities of the variable capacity compressor 40. Switching between the two can realize the switching of the operating capacity of the variable capacity compressor 40, which helps to improve seasonal energy efficiency. It is understandable that when the variable capacity compressor 40 is stopped, the leak-free thermal expansion valve 30 plays a partition role, the on-off state between the above-mentioned three does not need to change, that is, there is no need to switch the operating capacity of the variable capacity compressor 40.

The present disclosure can effectively utilize the residual cold or residual heat by configuring the leak-free thermal expansion valve 30, and use the different working states of a set of on-off structures at different timings, and at the same time realize the safe start and the switching of the operating capacity of the variable capacity compressor 40. While improving the annual energy efficiency of the air conditioning system, it is not only convenient for practical application, but also reduce the cost.

Figure 2:
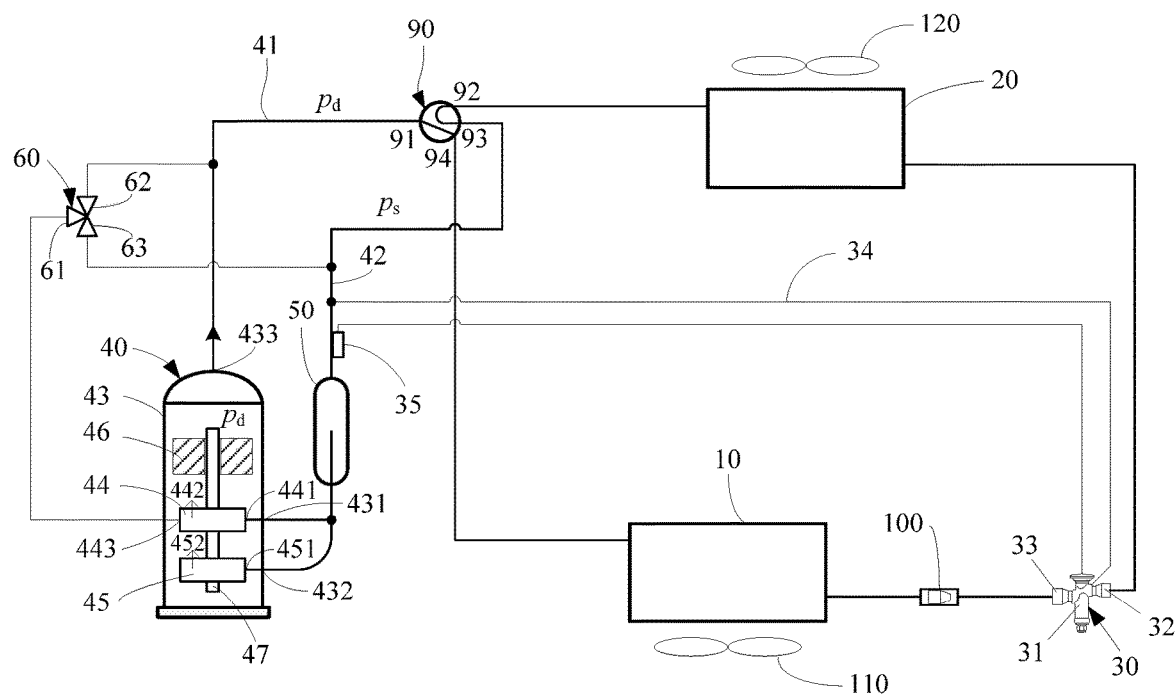
FIG. 2 shows a structural schematic diagram of an air conditioning system in a heating mode according to the embodiment of the present disclosure.

As shown in FIGS. 1 and 2, in some embodiments, the air conditioning system further comprises a three-way valve 60, wherein a first end port 61 of the three-way valve 60 is connected to the pressure relief hole 443, a second end port 62 of the three-way valve 60 is connected to the high-pressure pipe, and a third end port 63 of the three-way valve 60 is connected to the low-pressure pipe.

In this embodiment, an on-off scheme between the high-pressure pipe, the low-pressure pipe and the pressure relief hole 443 is defined. By configuring the three-way valve 60, its three end ports are respectively connected to the pressure relief hole 443, the high-pressure pipe and the low-pressure pipe, which can achieve different conduction states between the three, and then switch the different operating states of the air conditioning system. For example, the three-way valve 60 has three conduction states. In the first conduction state, the first end port 61 and the second end port 62 are turned on, and the third end port 63 is disconnected. At this time, the pressure relief hole 443 is connected with the high-pressure pipe, the first cylinder 44 can work normally, and the variable capacity compressor 40 operates at full-capacity. In the second conduction state, the first end port 61 and the third end port 63 are turned on, and the second end port 62 is disconnected. At this time, the pressure relief hole 443 is connected with the low-pressure pipe, the first cylinder 44 is unloaded, and the variable capacity compressor 40 only operates at partial-capacity. In the third conduction state, the second end port 62 and the third end port 63 are turned on, and the first end port 61 is disconnected, which can achieve rapid pressure balance before the variable capacity compressor 40 starts, ensuring the safety of the variable capacity compressor 40 restarting. This solution uses only one three-way valve 60 to achieve the following three functions: the variable capacity compressor 40 can switch between full-capacity operation mode and partial-capacity operation mode, maintain a high and low pressure difference when the variable capacity compressor 40 is stopped to make full use of the residual cold or residual heat in the indoor heat exchanger 10 of the air conditioning system, and achieve high and low pressure balance before the variable capacity compressor 40 starts to avoid the variable capacity compressor 40 from starting with load. While achieving the improvement of the annual energy efficiency of the air conditioning system, the goal of reducing the system cost has been achieved. Wherein the three-way valve 60 can be a variety of valves, for example, an electromagnetic three-way valve can be used to enhance automatic control.

Figure 3:
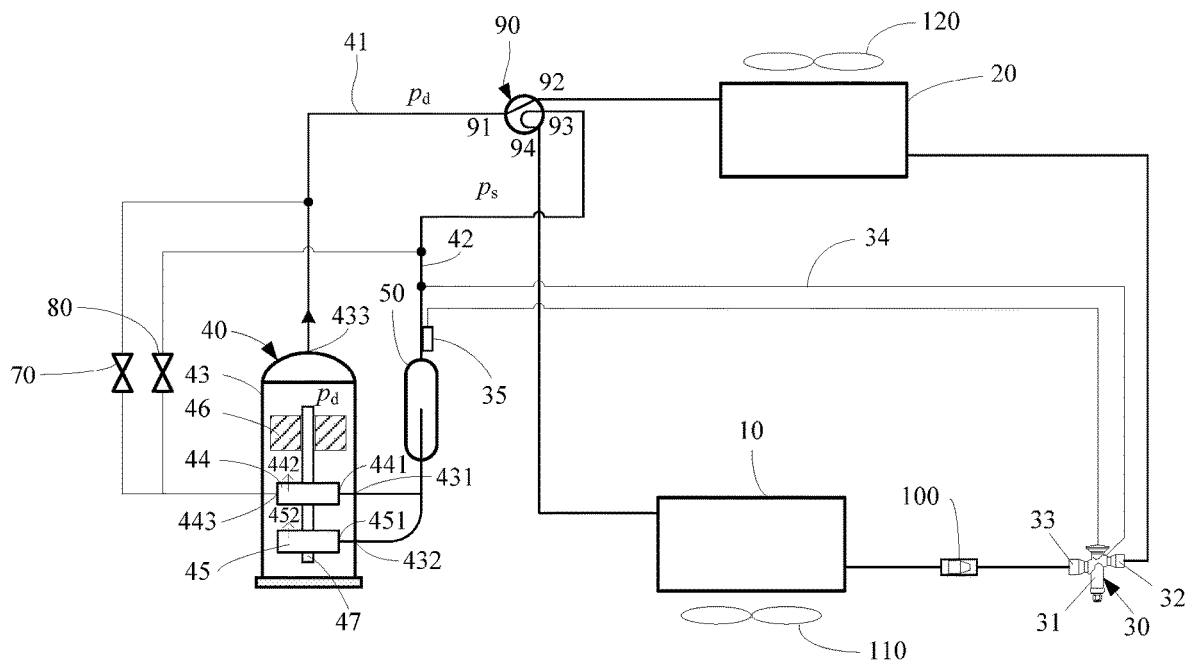
FIG. 3 shows a structural schematic diagram of an air conditioning system in a cooling mode according to another embodiment of the present disclosure.
Figure 4:
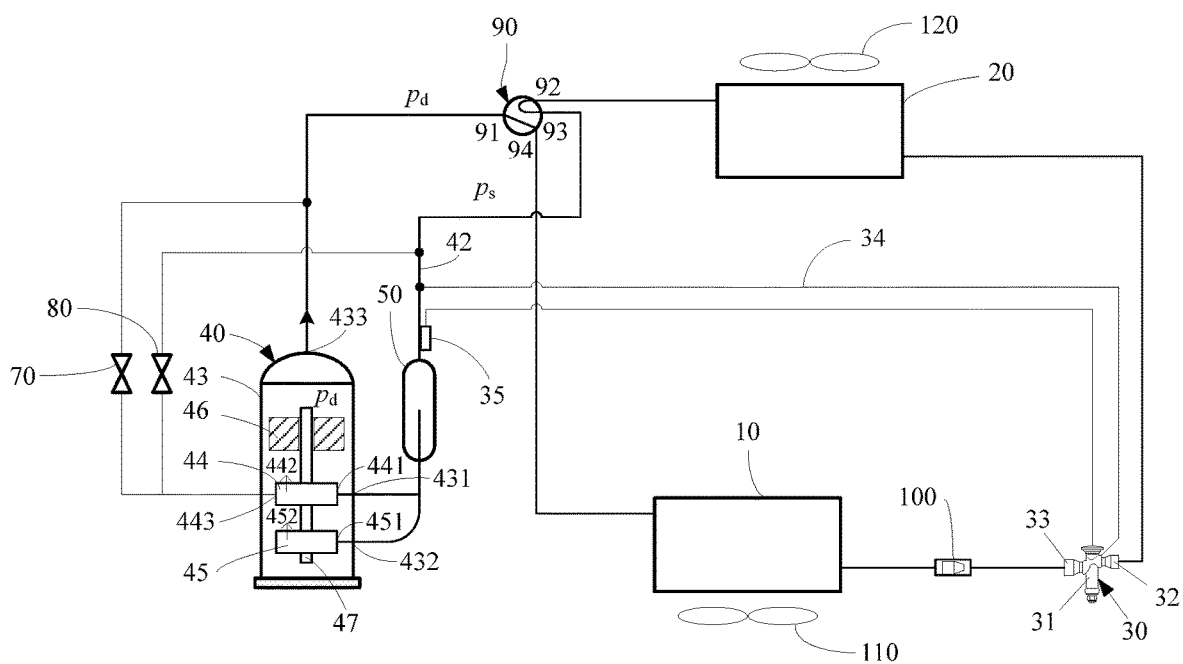
FIG. 4 shows a structural schematic diagram of an air conditioning system in a heating mode according to the embodiment of the present disclosure.

As shown in FIGS. 3 and 4, in some embodiments, the air conditioning system further comprises a first solenoid valve 70 and a second solenoid valve 80, the first solenoid valve 70 is connected between the pressure relief hole 443 and the high-pressure pipe; and the second solenoid valve 80, is connected between the pressure relief hole 443 and the low-pressure pipe.

In this embodiment, another on-off solution between the high-pressure pipe, the low-pressure pipe and the pressure relief hole 443 is defined. By configuring the first solenoid valve 70 between the pressure relief hole 443 and the high-pressure pipe, and configuring the second solenoid valve 80 between the pressure relief hole 443 and the low-pressure pipe, the first cylinder 44 can work normally when only the first solenoid valve 70 is turned on (equivalent to the first conduction state of the three-way valve 60); the first cylinder 44 can be unloaded when only the second solenoid valve 80 is turned on (equivalent to the second conduction state of the three-way valve 60); when the first solenoid valve 70 and the second solenoid valve 80 are turned on at the same time, the high-pressure pipe and the low-pressure pipe are connected through the pressure relief hole 443, which can achieve rapid pressure balance before the variable capacity compressor 40 is started (equivalent to the third conduction state of the three-way valve 60). By controlling the action timing of the first solenoid valve 70 and the second solenoid valve 80, the following three functions are realized: the variable capacity compressor 40 can switch between full-capacity operation mode and partial-capacity operation mode, maintain a high and low pressure difference when the variable capacity compressor 40 is stopped to make full use of the residual cold or residual heat in the indoor heat exchanger 10 of the air conditioning system, and achieve high and low pressure balance before the variable capacity compressor 40 starts to avoid the variable capacity compressor 40 from starting with load. The structure is simple, easy to control, and of low cost.

As shown in FIGS. 1 to 4, in some embodiments, the air conditioning system further comprises a four-way valve 90, wherein a first interface 91 of the four-way valve 90 is connected to the exhaust port 433, a second interface 92 of the four-way valve 90 is connected to the outdoor heat exchanger 20, and a third interface 93 of the four-way valve 90 is connected to the suction port, and a fourth interface 94 of the four-way valve 90 is connected to the indoor heat exchanger 10.

In this embodiment, the air conditioning system is also provided with a four-way valve 90, and the four-way valve 90 has four interfaces, which are connected to the exhaust port 433 and the outdoor heat exchanger 20 of the variable capacity compressor 40, and the suction port and the indoor heat exchanger 10 of the variable capacity compressor 40. The four-way valve 90 has two conduction states to switch between the cooling mode and the heating mode. As shown in FIGS. 1 and 3, in the first conduction state, the first interface 91 and the second interface 92 are connected, that is, the exhaust port 433 is connected with the outdoor heat exchanger 20, and the outdoor heat exchanger 20 is used as the condenser. The third interface 93 and the fourth interface 94 are connected, that is, the suction port is connected with the indoor heat exchanger 10, the indoor heat exchanger 10 is used as the evaporator, and the air conditioning system operates in the cooling mode. As shown in FIGS. 2 and 4, in the second conduction state, the first interface 91 and the fourth interface 94 are connected, that is, the exhaust port 433 is connected with the indoor heat exchanger 10, the indoor heat exchanger 10 is used as the condenser, the second interface 92 and the third interface 93 are connected, that is, the suction port is connected with the outdoor heat exchanger 20, and the outdoor heat exchanger 20 is used as the evaporator, the air conditioning system operates in the heating mode.

As shown in FIGS. 1 to 4, in some embodiments, both ends of the high-pressure pipe are respectively connected to the first interface 91 and the exhaust port 433, and both ends of the low-pressure pipe are respectively connected to the third interface 93 and the suction port.

In this embodiment, a setting solution for the high-pressure pipe and the low-pressure pipe is defined. The two are directly connected to the exhaust port 433 and suction port, adjacent to the pressure relief hole 443, which can shorten the layout of the pipeline.

In some embodiments, both ends of one of the high-pressure pipe and the low-pressure pipe are respectively connected to the indoor heat exchanger 10 and the leak-free thermal expansion valve 30, and both ends of another one of the high-pressure pipe and the low-pressure pipe are respectively connected to the outdoor heat exchanger 20 and the leak-free thermal expansion valve 30.

In this embodiment, another setting solution of the high-pressure pipe and the low-pressure pipe is defined. Since the leak-free thermal expansion valve 30 is connected between the indoor heat exchanger 10 and the outdoor heat exchanger 20, when the air conditioning system is operating normally, the pipes connected to its both ends are the high-pressure pipe and the low-pressure pipe, respectively. It is also possible to switch the capacity of the variable capacity compressor 40 and quickly balance the pressure before the variable capacity compressor 40 is started. The difference between this solution and the previous solution is that the pipelines at both ends of the leak-free thermal expansion valve 30 are not constant high-pressure pipes or low-pressure pipes. When the air conditioning system operates in the cooling mode, the outdoor heat exchanger 20 is on the high-pressure side and the indoor heat exchanger 10 is on the low-pressure side. The pipeline between the outdoor heat exchanger 20 and the leak-free thermal expansion valve 30 is a high-pressure pipe, the pipeline between the indoor heat exchanger 10 and the leak-free thermal expansion valve 30 is a low-pressure pipe; otherwise, they are interchanged, and it won't be repeated here.

In some embodiments, the leak-free thermal expansion valve 30 is a one-way throttling part, which only plays a throttling role when the refrigerant flows from the outdoor heat exchanger 20 to the indoor heat exchanger 10, and only plays a circulation role when the refrigerant flows in a reverse direction; as shown in FIGS. 1 to 4, the air conditioning system further comprises a one-way throttling device (for example, one-way throttling short pipe 100), wherein the one-way throttling device is connected to the leak-free thermal expansion valve 30, and only plays a throttling role when the refrigerant flows from the indoor heat exchanger 10 to the outdoor heat exchanger 20, and only plays a circulation role when the refrigerant flows in a reverse direction.

In this embodiment, the leak-free thermal expansion valve 30 is defined as a one-way throttling part, which only plays a throttling role when the refrigerant flows in the forward direction, and only plays a circulation role when the refrigerant flows in the reverse direction. In order to realize the normal operation of the air conditioning system in different modes, a one-way throttling device with the throttling direction opposite to the leak-free thermal expansion valve 30 is also set. The one-way throttling device also belongs to the one-way throttling part. With the cooperation of the two, it can ensure the smooth throttling of the refrigerant in both cooling mode and heating mode.

As shown in FIGS. 1 to 4, in some embodiments, the leak-free thermal expansion valve 30 comprises: a valve body 31, and a first valve port 32, a second valve port 33, an external balance tube 34, and a temperature sensing bag 35, and connected to the valve body 31; the first valve port 32 is directly or indirectly connected to the outdoor heat exchanger 20; the second valve port 33 is directly or indirectly connected to the indoor heat exchanger 10; the external balance tube 34 is connected with the suction port; and the temperature sensing bag 35 is arranged on a pipeline between the external balance tube 34 and the suction port, and adjacent to a pipeline junction point of the external balance tube 34 and the suction port, wherein, in a case where a pressure difference between the first valve port 32 and the second valve port 33 is greater than or equal to a conduction pressure difference, and the refrigerant flows from the first valve port 32 to the second valve port 33, the leak-free thermal expansion valve 30 plays a throttling role; in a case where a pressure difference between the first valve port 32 and the second valve port 33 is greater than or equal to a conduction pressure difference, and the refrigerant flows from the second valve port 33 to the first valve port 32, the leak-free thermal expansion valve 30 plays a circulation role; in a case where a pressure difference between the first valve port 32 and the second valve port 33 is less than a conduction pressure difference, the leak-free thermal expansion valve 30 is turned off.

In this embodiment, the structure of the leak-free thermal expansion valve 30 and the corresponding operating characteristics are defined. The leak-free thermal expansion valve 30 is a one-way throttling part with pressure-maintaining function, which can be turned on when the variable capacity compressor 40 is operating to ensure the smooth throttling of the refrigerant, and it will be turned off when the pressure difference between the high pressure side and the low pressure side is reduced, to avoid refrigerant mixing on the high pressure side and the low pressure side, the residual cold or residual heat in the indoor heat exchanger 10 can be used to improve the annual energy efficiency of the air conditioning system. The one-way throttling short pipe 100 and the leak-free thermal expansion valve 30 can be connected in series or in parallel. When in series, the one-way throttling short pipe 100 can be connected to the side where the first valve port 32 of the leak-free thermal expansion valve 30 is located or connect to the side where the second valve port 33 is located. For example, the one-way throttling short pipe 100 has a forward end and a reverse end. When the one-way throttling short pipe 100 is connected in series on the side where the second valve port 33 is located, the reverse end is connected to the second valve port 33, and the forward end is connected to one end of the indoor heat exchanger 10, that is, the second valve port 33 and one end of the indoor heat exchanger 10 are indirectly connected via the one-way throttling short pipe 100. When the refrigerant flows from the reverse end to the forward end, the one-way throttling short pipe 100 has no throttling function and only plays a circulation role; when the refrigerant flows from the forward end to the reverse end, the one-way throttling short pipe 100 plays a throttling role.

In some embodiments, a value range of the first preset duration is 3 to 60 seconds.

In this embodiment, the value range of the first preset duration is specifically defined from 3 to 60 seconds. The lower limit can ensure the effective balance of the pressure difference between the high pressure side and the low pressure side, and ensure the smooth and safe start of the variable capacity compressor 40. The upper limit helps to control the time-consuming adjustment of the pressure, and avoids the air conditioning system from being turned on for a long time and affecting the user's experience. Furthermore, the value range of the first preset duration can be reduced to 3 to 55 seconds, and its typical value range is 5 to 15 seconds.

As shown in FIGS. 1 to 4, in some embodiments, the air conditioning system further comprises an indoor fan 110 and a controller (not shown in the figure), the indoor fan 110 is arranged toward the indoor heat exchanger 10; and the controller is electrically connected to the indoor fan 110, and controlling the indoor fan 110 to continue to operate for a second preset duration after the variable capacity compressor 40 is stopped.

In this embodiment, the air conditioning system also comprises an indoor fan 110 set towards the indoor heat exchanger 10 and a controller electrically connected to the indoor fan 110. The indoor fan 110 is controlled by the controller to continue to operate for a second preset duration after the shutdown, and the air can continue to be supplied to the room. This makes full use of the residual cold or residual heat of the refrigerant remaining in the indoor heat exchanger 10 after the shutdown, which is beneficial to increase the energy efficiency of the air conditioning system. Furthermore, the air conditioning system also comprises an outdoor fan 120 set toward the outdoor heat exchanger 20 to improve the heat exchange efficiency of the outdoor heat exchanger 20. It is conceivable that all electrical components in the air conditioning system can be controlled by the controller, such as the three-way valve 60, the first solenoid valve 70, the second solenoid valve 80 and the four-way valve 90.

In some embodiments, a value range of the second preset duration is 60 to 90 seconds.

In this embodiment, the value range of the second preset duration is specifically defined from 60 to 90 seconds. This lower limit can ensure full use of the residual cold or residual heat of the refrigerant in the indoor heat exchanger 10, and increase the energy efficiency of the air conditioning system. The upper limit can avoid blowing hot or cold air into the room after the residual cold or residual heat is exhausted, which helps to improve the health and comfort of users.

Next, the operation process of the air conditioning system provided by the present disclosure will be introduced through two operation modes.

Operation Mode 1

The air conditioning system shown in FIGS. 1 and 2 comprises an indoor heat exchanger 10, an outdoor heat exchanger 20, a leak-free thermal expansion valve 30, a variable capacity compressor 40, a gas-liquid separator 50, a three-way valve 60, a four-way valve 90, a one-way throttling short pipe 100, an indoor fan 110, and an outdoor fan 120, etc.

The air conditioning system shown in FIG. 1, under the control of the three-way valve 60, can switch the variable capacity compressor 40 between full-capacity operation mode and partial-capacity operation mode. In each operating mode, it can be divided into the compressor operating phase, the pressure-maintaining phase during the compressor shutdown, and the pressure unloading phase before the compressor is turned on. In the compressor operation phase, the variable capacity compressor 40 can operate at full-capacity or partial-capacity; in the shutdown and pressure-maintaining phase, the variable capacity compressor 40 stops operating, but the outdoor heat exchanger 20 maintains a high-pressure state, and the indoor heat exchanger 10 maintains a low-pressure state (this is when in cooling mode, it will be the opposite when in heating mode). In the pressure unloading phase, the variable capacity compressor 40 is in the shutdown state, but the pressure difference between the suction pipe 42 and the exhaust pipe 41 of the variable capacity compressor 40 quickly reaches a state of close to equilibrium to reduce the start pressure difference of the variable capacity compressor 40. This is to prepare for the next startup and re-enter the operation phase of the variable capacity compressor 4. The details are as follows:

1. Full-Capacity Operation Mode
(1a) A Phase where the Compressor is Operating at Full-Capacity As shown in FIGS. 1 and 2, at this phase, the variable capacity compressor 40 operates at full-capacity, the three-way valve 60 is in the first conduction state, and the four-way valve 90 is in the first conduction state (in the cooling mode as shown in FIG. 1) or in the second conduction state (in heating mode as shown in FIG. 2).

When the three-way valve 60 is in the first conduction state, the first end port 61 and the second end port 62 are turned on, and the pressure relief hole 443 and the exhaust port 433 of the first cylinder 44 of the variable capacity compressor 40 are connected. When the motor 46 of the variable capacity compressor 40 is energized, the second cylinder 45 is driven to operate, and the gas at the second suction hole 451 is compressed to high-pressure, and discharged from the second exhaust hole 452 into the shell 43 of the variable capacity compressor 40, and then the gas is discharged out of the variable capacity compressor 40 through the exhaust port 433 of the variable capacity compressor 40. Since the pressure relief hole 443 of the first cylinder 44 is connected with the exhaust port 433, the high-pressure gas discharged from the exhaust port 433 is introduced to the pressure relief hole 443, so that the pressure relief hole 443 is also in a high-pressure state, so the first cylinder 44 can work normally, that is, the first cylinder 44 and the second cylinder 45 can compress gas, and the variable capacity compressor 40 is in full-capacity operation mode.

In the full-capacity operation phase, the first cylinder 44 sucks in gas from the first suction hole 441, compresses and boosts the gas, discharges it from the first exhaust hole 442 into the shell 43 of the variable capacity compressor 40, and mixes with the gas discharged into the shell 43 from the second cylinder 45, and then they are discharged out of the variable capacity compressor 40 through the exhaust port 433 of the variable capacity compressor 40 together.

As shown in FIG. 1, when the air conditioning system is in the refrigeration cycle mode, the refrigerant discharged from the variable capacity compressor 40 passes through the first interface 91 of the four-way valve 90→the second interface 92 of the four-way valve 90→the outdoor heat exchanger 20→the leak-free thermal expansion valve 30→the one-way throttling short pipe 100→the indoor heat exchanger 10→the fourth interface 94 of the four-way valve 90→the third interface 93→the gas-liquid separator 50, return to the first suction port 431 and the second suction port 432 of the variable capacity compressor 40, forming a complete refrigeration cycle. In the refrigeration cycle mode, the outdoor heat exchanger 20 is in a high-pressure condensation state, and the indoor heat exchanger 10 is in a low-pressure evaporation state. The two sides of the leak-free thermal expansion valve 30 are in a state of large pressure difference, so the leak-free thermal expansion valve 30 is in a state of conduction and normal throttling. In the refrigeration cycle mode, the one-way throttling short pipe 100 is in the reverse flow state, at this time the one-way throttling short pipe 100 has no throttling function, only the circulation function.

As shown in FIG. 2, when the air conditioning system is in the heating cycle mode, the refrigerant discharged from the variable capacity compressor 40 passes through the first interface 91 of the four-way valve 90→the fourth interface 94 of the four-way valve 90→the indoor heat exchanger 10→the one-way throttling short pipe 100→the leak-free thermal expansion valve 30→the outdoor heat exchanger 20→the second interface 92 of four-way valve 90→the third interface 93 of the four-way valve 90→the gas-liquid separator 50→the first suction port 431 and the second suction port 432 of the variable capacity compressor 40, forming a complete heating cycle. In the heating cycle mode, the one-way throttling short pipe 100 is in a forward flow state, and at this time, the one-way throttling short pipe 100 plays a throttling role. In the heating cycle mode, the indoor heat exchanger 10 is in a high-pressure condensation state, and the outdoor heat exchanger 20 is in a low-pressure evaporation state. The two sides of the leak-free thermal expansion valve 30 are in a state of large reverse pressure difference. At this time, the leak-free thermal expansion valve 30 has no throttling function, only circulation function. The one-way throttling short pipe 100 is in a forward flow state, at this time, the one-way throttling short pipe 100 plays a throttling role.

In the full-capacity operation phase, the indoor fan 110 and the outdoor fan 120 continue to operate, and the indoor fan 110 brings the cold or heat of the indoor heat exchanger 10 to the room through air circulation, to cool or heat the room.

(1b) Shutdown and Pressure-Maintaining Phase

As shown in FIGS. 1 and 2, during the shutdown and pressure-maintaining phase, the variable capacity compressor 40 stops operating, while the three-way valve 60 maintains the first conduction state.

When the variable capacity compressor 40 just stops operating, the pressure on both sides of the leak-free thermal expansion valve 30 will initially tend to balance, that is, the refrigerant on the high-pressure side will continue to flow to the low-pressure side, so that the pressure on the high-pressure side is reduced, and the pressure on the low-pressure side is reduced. But when the pressure difference between the two sides of the leak-free thermal expansion valve 30 is reduced to the cut-off pressure of the leak-free thermal expansion valve 30, the leak-free thermal expansion valve 30 will be cut off. At this time, the refrigerant on the high-pressure side can no longer flow to the low-pressure side, thus the refrigerant that still has a certain pressure difference is limited to the high-pressure side and low-pressure side of the system, respectively.

When the variable capacity compressor 40 just stopped, if the air conditioning system is working in the cooling mode before shutdown, there will still be high-pressure refrigerant with higher temperature in the outdoor heat exchanger 20 after the shutdown, but there will still be low-pressure refrigerant with low temperature in the indoor heat exchanger 10. At this time, if the indoor fan 110 continues to operate, it can continue to send cold air to the room, so as to make full use of the residual cold of the refrigerant remaining in the indoor heat exchanger 10 after the variable capacity compressor 40 is stopped, it is beneficial to increase the cooling season energy efficiency of the air conditioning system and improve the annual energy efficiency ratio of the air conditioning system.

When the variable capacity compressor 40 just stopped, if the air conditioning system is working in heating mode before shutdown, after shutdown, the indoor heat exchanger 10 still has the high-pressure refrigerant with higher temperature. However, in the outdoor heat exchanger 20, there is still the low-pressure refrigerant with lower temperature. At this time, if the indoor fan 110 continues to operate, it can continue to send hot air to the room, thus making full use of the residual heat of the refrigerant remaining in the indoor heat exchanger 10 after the variable capacity compressor 40 is stopped, it is beneficial to increase the heating season energy efficiency of the air conditioning system and improve the annual energy efficiency ratio of the air conditioning system.

The duration of the shutdown and pressure-maintaining phase is generally 3 to 5 minutes. At this phase, the variable capacity compressor 40 and the outdoor fan 120 remain in the stopped state, and the continuous operation time of the indoor fan 110 is less than or equal to the shutdown time of the variable capacity compressor 40. Typically, the indoor fan 110 will continue to operate for 60 to 90 seconds after the variable capacity compressor 40 is stopped.

(1c) Pressure Unloading Phase

As shown in FIGS. 1 and 2, in the pressure unloading phase, the variable capacity compressor 40 maintains a stopped state, while the three-way valve 60 switches to the third conduction state, and delays for a period of time $t_d$ (i.e., the first preset duration) in the third conduction state. The $t_d$ is 3 to 60 seconds, typically 5 to 15 seconds.

When the three-way valve 60 is in the third conduction state, the third end port 63 and the second end port 62 are turned on, and the exhaust port 433, and the first suction port 431 and the second suction port 432 of the variable capacity compressor 40 are connected. The high-pressure gaseous refrigerant in the exhaust pipe 41 of the variable capacity compressor 40 will immediately bypass through the second end port 62 and the third end port 63 of the three-way valve 60 to the first suction port 431 and the second suction port 432 of the variable capacity compressor 40, so that the pressure difference between the suction port and the exhaust port 433 of the first cylinder 44 and the second cylinder 45 is getting smaller and smaller. At the same time, the pressure difference between the outdoor heat exchanger 20 and the indoor heat exchanger 10 is getting smaller and smaller. At the end of the $t_d$ period, the pressure difference at the suction port and the exhaust port 433 of the first cylinder 44 and the second cylinder 45 is close to the same, that is, the pressure unloading is realized.

When the delay time $t_d$ ends, the pressure unloading phase ends and then it returns to the operating phase of the variable capacity compressor 40, and the three-way valve 60 switches back to the first conduction state. At the same time, the variable capacity compressor 40 starts. Since the high and low pressures are balanced during the pressure unloading phase, the variable capacity compressor 40 has a small starting load and can start smoothly.

2. Partial-Capacity Working Style (2a) A Phase where the Variable Capacity Compressor 40 Operates at Partial-Capacity As shown in FIGS. 1 and 2, at this phase, the variable capacity compressor 40 operates at partial-capacity, the three-way valve 60 is in the second conduction state, and the four-way valve 90 is in the first conduction state (in the cooling mode as shown in FIG. 1) or the second connected state (in the heating mode as shown in FIG. 2).

When the three-way valve 60 is in the second conduction state, the first end port 61 and the third end port 63 are connected, and the pressure relief hole 443 of the first cylinder 44 of the variable capacity compressor 40 is connected with the suction pipe 42 of the variable capacity compressor 40 and the first suction hole 441 of the first cylinder 44. At this time, the first cylinder 44 is unloaded, and the gas cannot be compressed normally, while the second cylinder 45 can still compress the gas normally. When the motor 46 of the variable capacity compressor 40 is energized, the second cylinder 45 is driven to operate, and the gas at the second suction hole 451 is compressed to high-pressure, and discharged from the second exhaust hole 452 into the shell 43 of the variable capacity compressor 40, and then the gas is discharged out of the variable capacity compressor 40 through the exhaust port 433 of the variable capacity compressor 40. Since the pressure relief hole 443 of the first cylinder 44 is connected with the suction port, the pressure at the pressure relief hole 443 and the pressure at the suction port are both low-pressure, so when the motor 46 is energized, the first cylinder 44 can only operate idly and cannot compress the gas normally. Therefore, the variable capacity compressor 40 is in partial-capacity operation mode.

As shown in FIG. 1, when the air conditioning system is in refrigeration cycle mode, the refrigerant discharged from the variable capacity compressor 40 passes through the first interface 91 of the four-way valve 90→the second interface 92 of the four-way valve 90→the outdoor heat exchanger 20→the leak-free thermal expansion valve 30→the one-way throttling short pipe 100→the indoor heat exchanger 10→the fourth interface 94 of the four-way valve 90→the third interface 93→the gas-liquid separator 50, return to the second suction port 432 of the variable capacity compressor 40, forming a complete refrigeration cycle. In the refrigeration cycle mode, the outdoor heat exchanger 20 is in a high-pressure condensation state, and the indoor heat exchanger 10 is in a low-pressure evaporation state. The two sides of the leak-free thermal expansion valve 30 are in a state of large pressure difference. Therefore, the leak-free thermal expansion valve 30 is in a state of conduction and normal throttling. In the refrigeration cycle mode, the one-way throttling short pipe 100 is in a reverse flow state, at this time, the one-way throttling short pipe 100 has no throttling function, only the circulation function.

As shown in FIG. 2, when the air conditioning system is in the heating cycle mode, the refrigerant discharged from the variable capacity compressor 40 passes through the first interface 91 of the four-way valve 90→the fourth interface 94 of the four-way valve 90→the indoor heat exchanger 10→the one-way throttling short pipe 100→the leak-free thermal expansion valve 30→the outdoor heat exchanger 20→the second interface 92 of the four-way valve 90→the third interface 93 of the four-way valve 90→the gas-liquid separator 50→the second suction port 432 of the variable capacity compressor 40, forming a complete heating cycle. In the heating cycle mode, the one-way throttling short pipe 100 is in a forward flow state, at this time, the one-way throttling short pipe 100 plays a throttling role. In the heating cycle mode, the indoor heat exchanger 10 is in a high-pressure condensation state, and the outdoor heat exchanger 20 is in a low-pressure evaporation state. The two sides of the leak-free thermal expansion valve 30 are in a state of large reverse pressure difference. At this time, the leak-free thermal expansion valve 30 has no throttling function, only circulation function. The one-way throttling short pipe 100 is in a forward flow state, at this time the one-way throttling short pipe 100 plays a throttling role.

In the partial-capacity operation phase, the indoor fan 110 and the outdoor fan 120 continue to operate, and the indoor fan 110 brings the cold or heat of the indoor heat exchanger 10 to the room through air circulation to cool or heat the room.

(2b) Shutdown and Pressure-Maintaining Phase

As shown in FIGS. 1 and 2, during the shutdown and pressure-maintaining phase, the variable capacity compressor 40 stops operating, while the three-way valve 60 maintains the second conduction state.

When the variable capacity compressor 40 just stops operating, the pressure on both sides of the leak-free thermal expansion valve 30 will initially tend to balance, that is, the refrigerant on the high-pressure side will continue to flow to the low-pressure side, so that the pressure on the high-pressure side is reduced, and the pressure on the low-pressure side is reduced. But when the pressure difference between the two sides of the leak-free thermal expansion valve 30 is reduced to the cut-off pressure of the leak-free thermal expansion valve 30, the leak-free thermal expansion valve 30 will be cut off. At this time, the refrigerant on the high-pressure side can no longer flow to the low-pressure side, thus the refrigerant that still has a certain pressure difference is limited to the high-pressure side and low-pressure side of the system, respectively.

When the variable capacity compressor 40 just stopped, if the air conditioning system is working in the cooling mode before shutdown, there will still be high-pressure refrigerant with higher temperature in the outdoor heat exchanger 20 after the shutdown, but there will still be low-pressure refrigerant with low temperature in the indoor heat exchanger 10. At this time, if the indoor fan 110 continues to operate, it can continue to send cold air to the room, so as to make full use of the residual cold of the refrigerant remaining in the indoor heat exchanger 10 after the variable capacity compressor 40 is stopped, it is beneficial to increase the cooling season energy efficiency of the air conditioning system and improve the annual energy efficiency ratio of the air conditioning system.

When the variable capacity compressor 40 just stopped, if the air conditioning system is working in heating mode before shutdown, after shutdown, the indoor heat exchanger 10 still has the high-pressure refrigerant with higher temperature. However, in the outdoor heat exchanger 20, there is still the low-pressure refrigerant with lower temperature. At this time, if the indoor fan 110 continues to operate, it can continue to send hot air to the room, thus making full use of the residual heat of the refrigerant remaining in the indoor heat exchanger 10 after the variable capacity compressor 40 is stopped, it is beneficial to increase the heating season energy efficiency of the air conditioning system and improve the annual energy efficiency ratio of the air conditioning system.

The duration of the shutdown and pressure-maintaining phase is generally 3 to 5 minutes. At this phase, the variable capacity compressor 40 and the outdoor fan 120 remain in the stopped state, and the continuous operation time of the indoor fan 110 is less than or equal to the shutdown time of the variable capacity compressor 40. Typically, the indoor fan 110 will continue to operate for 60 to 90 seconds after the variable capacity compressor 40 is stopped.

(2c) Pressure Unloading Phase

As shown in FIGS. 1 and 2, in the pressure unloading phase, the variable capacity compressor 40 maintains a stopped state, while the three-way valve 60 switches to the third conduction state, and delays for a period of time $t_d$.

When the three-way valve 60 is in the third conduction state, the third end port 63 and the second end port 62 are turned on, and the exhaust port 433, and the first suction port 431 and the second suction port 432 of the variable capacity compressor 40 are connected. The high-pressure gaseous refrigerant in the exhaust pipe 41 of the variable capacity compressor 40 will immediately bypass through the second end port 62 and the third end port 63 of the three-way valve 60 to the first suction port 431 and the second suction port 432 of the variable capacity compressor 40, so that the pressure difference between the suction port and the exhaust port 433 of the first cylinder 44 and the second cylinder 45 is getting smaller and smaller. At the same time, the pressure difference between the outdoor heat exchanger 20 and the indoor heat exchanger 10 is getting smaller and smaller. At the end of the $t_d$ period, the pressure difference at the suction port and the exhaust port 433 of the first cylinder 44 and the second cylinder 45 is close to the same, that is, the pressure unloading is realized.

When the delay time $t_d$ ends, the pressure unloading phase ends and then it returns to the operating phase of the variable capacity compressor 40, and the three-way valve 60 switches back to the second conduction state. At the same time, the variable capacity compressor 40 starts. Since the high and low pressures are balanced during the pressure unloading phase, the variable capacity compressor 40 has a small starting load and can start smoothly.

Operation Mode 2

The air conditioning system shown in FIGS. 3 and 4 comprises an indoor heat exchanger 10, an outdoor heat exchanger 20, a leak-free thermal expansion valve 30, a variable capacity compressor 40, a gas-liquid separator 50, a first solenoid valve 70, a second solenoid valve 80, a four-way valve 90, a one-way throttling short pipe 100, an indoor fan 110, and an outdoor fan 120, etc., and the difference from the operation mode 1 is that the three-way valve 60 is replaced by the first solenoid valve 70 and the second solenoid valve 80. When the first solenoid valve 70 is turned on and the second solenoid valve 80 is turned off, it is equivalent to the three-way valve 60 is in the first conductive state; when the first solenoid valve 70 is turned off and the second solenoid valve 80 is turned on, it is equivalent to the three-way valve 60 is in the second conducting state; when the first solenoid valve 70 is turned on and the second solenoid valve 80 is turned on, it is equivalent to the three-way valve 60 is in the third conductive state. Therefore, by combining the switching states of the first solenoid valve 70 and the second solenoid valve 80, the same function as the operation mode 1 can be achieved.

The air conditioning system shown in FIG. 3, under the control of the first solenoid valve 70 and the second solenoid valve 80, the variable capacity compressor 40 can be switched between full-capacity operation mode and partial-capacity operation mode. In each operating mode, it can be divided into the compressor operating phase, the pressure-maintaining phase during the compressor shutdown, and the pressure unloading phase before the compressor is turned on. In the compressor operation phase, the variable capacity compressor 40 can operate at full-capacity or partial-capacity; in the shutdown and pressure-maintaining phase, the variable capacity compressor 40 stops operating, but the outdoor heat exchanger 20 maintains a high-pressure state, and the indoor heat exchanger 10 maintains a low-pressure state (this is when in cooling mode, it will be the opposite when in heating mode). In the pressure unloading phase, the variable capacity compressor 40 is in the shutdown state, but the pressure difference between the suction pipe 42 and the exhaust pipe 41 of the variable capacity compressor 40 quickly reaches a state of close to equilibrium to reduce the start pressure difference of the variable capacity compressor 40. This is to prepare for the next startup and re-enter the operation phase of the variable capacity compressor 4. Operation mode 1 can be referred to for the details. For the purpose of brevity, such details are not repeated herein.

In summary, the embodiments of the present disclosure provide an air conditioning system with a leak-free thermal expansion valve 30 as a throttling part. During the operation of the compressor, it can give full play to the advantages of reliable operation of the thermal expansion valve, high throttling efficiency, and ability to maintain the suction superheat at a stable value. When the compressor is stopped, the refrigerant whose temperature is still higher and lower can be restricted to the outdoor heat exchanger 20 or the indoor heat exchanger 10, respectively, so that the high-temperature refrigerant and the low-temperature refrigerant cannot be mixed with each other. Therefore, during the compressor shutdown period, the heating capacity of the high temperature refrigerant and the heat absorption capacity of the low temperature refrigerant are retained, respectively, so that the residual cold or residual heat in the indoor heat exchanger 10 can be fully utilized, and the seasonal energy efficiency ratio of the air conditioning system is effectively improved, and the system energy saving benefits prominent. At the moment when the compressor starts, the high pressure side and the low pressure side are connected through the switch of the valve, which can quickly reduce the pressure difference between the suction port and the exhaust port 433 of the compressor cylinder, reduce the pressure in the compressor discharge chamber, and prevent the compressor from starting up under pressure, such as excessive starting current, difficulty in starting, shock, and vibration when the compressor is restarted, which is beneficial to prolong the life of the compressor. At the same time, the embodiments of the present disclosure can realize that the air conditioning system uses full-capacity operation when the load is large, and uses partial-capacity operation when the load is small. This further improves the seasonal energy efficiency ratio of the air conditioning system, making the air conditioning system more energy-efficient.

In the present disclosure, the term "plurality" means two or more, unless otherwise expressly defined. In the description of the present disclosure, the terms "installing", "connected", "connection", "fixing" and the like should be understood in a broad sense. For example, "connection" may be a fixed connection, a removable connection or an integral connection; and "connected" may refer to direct connection or indirect connection through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples. A person of ordinary skills in the art could understand the specific meaning of the terms in the present disclosure according to specific situations.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:
1. An air conditioning system comprising:
a high-pressure pipe for circulation of high-pressure refrigerant;
a low-pressure pipe for circulation of low-pressure refrigerant, the low-pressure pipe being connectable to the high-pressure pipe in an on-off manner;
an indoor heat exchanger connected to one of the high-pressure pipe and the low-pressure pipe;
an outdoor heat exchanger connected to another one of the high-pressure pipe and the low-pressure pipe;
a leak-free thermal expansion valve connected between the indoor heat exchanger and the outdoor heat exchanger; and
a variable capacity compressor comprising:
a shell with a suction port and an exhaust port;
a first cylinder with a first suction hole connected to the suction port, a first exhaust hole connected to the exhaust port, and a pressure relief hole; and
a second cylinder with a second suction hole connected to the suction port and a second exhaust hole connected to the exhaust port,
wherein:
the high-pressure pipe, the low-pressure pipe, and the pressure relief hole are connectable in three conduction states; and
prior to starting the variable capacity compressor and for a first preset duration, the high-pressure pipe, the low-pressure pipe, and the pressure relief hole are connected in a third conduction state of the three conduction states where the high-pressure pipe and the low-pressure pipe are connected.

2. The air conditioning system according to claim 1, wherein:
the high-pressure pipe, the low-pressure pipe, and the pressure relief hole are connectable via a three-way valve, and
a first end port of the three-way valve is connected to the pressure relief hole, a second end port of the three-way valve is connected to the high-pressure pipe, and a third end port of the three-way valve is connected to the low-pressure pipe.

3. The air conditioning system according to claim 1, wherein the high-pressure pipe, the low-pressure pipe, and the pressure relief hole are connectable via a pair of solenoid valves, the solenoid valves comprising:
a first solenoid valve, connected between the pressure relief hole and the high-pressure pipe; and
a second solenoid valve, connected between the pressure relief hole and the low-pressure pipe.

4. The air conditioning system according to claim 1, wherein:
the air conditioning system further comprises a four-way valve, and
a first interface of the four-way valve is connected to the exhaust port, a second interface of the four-way valve is connected to the outdoor heat exchanger, a third interface of the four-way valve is connected to the suction port, and a fourth interface of the four-way valve is connected to the indoor heat exchanger.

5. The air conditioning system according to claim 4, wherein:
both ends of the high-pressure pipe are respectively connected to the first interface and the exhaust port, and both ends of the low-pressure pipe are respectively connected to the third interface and the suction port; or both ends of one of the high-pressure pipe and the low-pressure pipe are respectively connected to the indoor heat exchanger and the leak-free thermal expansion valve, and both ends of the other one of the high-pressure pipe and the low-pressure pipe are respectively connected to the outdoor heat exchanger and the leak-free thermal expansion valve.

6. The air conditioning system according to claim 4, wherein:
the leak-free thermal expansion valve comprises a one-way throttling part, wherein the one-way throttling part only functions to throttle when the refrigerant flows from the outdoor heat exchanger to the indoor heat exchanger and only functions to circulate when the refrigerant flows in a reverse direction;
the air conditioning system further comprises a one-way throttling device, wherein the one-way throttling device is connected to the leak-free thermal expansion valve, and wherein the one-way throttling device only functions to throttle when the refrigerant flows from the indoor heat exchanger to the outdoor heat exchanger and only functions to circulate when the refrigerant flows in a reverse direction.

7. The air conditioning system according to claim 6, wherein the leak-free thermal expansion valve comprises:
a valve body;
a first valve port, connected to the valve body, and directly or indirectly connected to the outdoor heat exchanger;
a second valve port, connected to the valve body, and directly or indirectly connected to the indoor heat exchanger;
an external balance tube, connected to the valve body, and connected to the suction port; and
a temperature sensing bag, connected to the valve body, and being arranged on a pipeline between the external balance tube and the suction port, and adjacent to a pipeline junction point of the external balance tube and the suction port,
wherein:
upon a determination that a pressure difference between the first valve port and the second valve port is greater than or equal to a conduction pressure difference and that the refrigerant flows from the first valve port to the second valve port, the leak-free thermal expansion valve functions to throttle;
upon a determination that a pressure difference between the first valve port and the second valve port is greater than or equal to a conduction pressure difference and that the refrigerant flows from the second valve port to the first valve port, the leak-free thermal expansion valve functions to circulate; and
upon a determination that a pressure difference between the first valve port and the second valve port is less than a conduction pressure difference, the leak-free thermal expansion valve is turned off.

8. The air conditioning system according to claim 1, wherein a value range of the first preset duration is 3 to 60 seconds.

9. The air conditioning system according to claim 1, wherein the air conditioning system further comprises:
an indoor fan, being arranged toward the indoor heat exchanger; and
a controller, electrically connected to the indoor fan, and controlling the indoor fan to continue to operate for a second preset duration after the variable capacity compressor is stopped.

10. The air conditioning system according to claim 9, wherein a value range of the second preset duration is 60 to 90 seconds.

11. The air conditioning system according to claim 1, wherein the conduction states further comprise:
a first conduction state where the pressure relief hole and the high-pressure pipe are connected; and
a second conduction state where the pressure relief hole and the low-pressure pipe are connected.

12. The air conditioning system according to claim 11, wherein, prior to starting the variable capacity compressor and after the first preset duration, the high-pressure pipe, the low-pressure pipe, and the pressure relief hole are connected in the first conduction state or the second conduction state.

\* \* \* \* \*